(12) United States Patent
Laurent

(10) Patent No.: US 6,569,948 B2
(45) Date of Patent: May 27, 2003

(54) POLYETHYLENE PIPE METHOD

(75) Inventor: Etienne Laurent, Seneffe (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 10/119,968

(22) Filed: Apr. 10, 2002

(65) Prior Publication Data

US 2002/0161157 A1 Oct. 31, 2002

Related U.S. Application Data

(62) Division of application No. 09/538,541, filed on Mar. 30, 2000, now Pat. No. 6,433,095.

(30) Foreign Application Priority Data

Mar. 30, 1999 (EP) .............................. 99106461

(51) Int. Cl.[7] ................................. C08F 10/02
(52) U.S. Cl. ........................ 525/240; 525/319; 525/324; 428/36.9; 405/154.1
(58) Field of Search ............... 405/154.1; 428/36.9; 525/240, 319, 324

(56) References Cited

U.S. PATENT DOCUMENTS

| 4,547,551 A | 10/1985 | Bailey et al. |
| 5,284,613 A | 2/1994 | Ali et al. |
| 5,405,901 A | 4/1995 | Daniell et al. |
| 6,191,227 B1 | 2/2001 | Matsuoka et al. |

FOREIGN PATENT DOCUMENTS

| EP | 0533154 | 3/1991 |

*Primary Examiner*—Caixia Lu
(74) *Attorney, Agent, or Firm*—Grady K. Bergen

(57) ABSTRACT

Provided is a high density multimodal polyethylene, having a shear ratio (SR) of 18 or more and comprising at least 20% by weight of a high molecular weight fraction, which high molecular weight fraction has:

(a) a density ($\rho$) of 0.930 g/cm$^3$ or less; and
(b) a high load melt index (HLMI) of 0.30 g/10 mins or less.

8 Claims, No Drawings

POLYETHYLENE PIPE METHOD

This application is a division of U.S. patent application Ser. No. 09/538,541, filed Mar. 30, 2000, now U.S. Pat. No. 6,433,095 B1, and entitled High Density Multimodal Polyethylene.

BACKGROUND TO THE INVENTION

The present invention is concerned with high density multimodal polyethylenes, methods for their production and uses thereof. In particular the invention relates to high density multimodal polyethylenes having especially superior stress-crack resistance. These polyethylenes can be used in polyethylene pipes to increase their stress-crack resistance making them suitable for use in no-sand pipe installation.

DESCRIPTION OF THE PRIOR ART

Polyolefins such as polyethylenes which have high molecular weight generally have improved mechanical properties over their lower molecular weight counterparts. However, high molecular weight polyolefins can be difficult to process and can be costly to produce. Polyolefins having a multimodal molecular weight distribution (MWD) are desirable because they can combine the advantageous mechanical properties of high molecular weight fraction with the improved processing properties of one or more lower molecular weight fractions.

For many high density polyethylene (HDPE) applications, polyethylene with enhanced toughness, strength and environmental stress cracking resistance (ESCR) is important. These enhanced properties are more readily attainable with high molecular weight (HMW) polyethylene. However, as the molecular weight of the polymer increases, the processibility of the resin decreases. By providing a polymer with a broad or bimodal MWD, the desired properties that are characteristic of high molecular weight resin are retained while processibility, particularly extrudibility, is improved.

There are several methods for the production of multimodal or broad molecular weight distribution resins: melt blending, reactor in series configuration, or single reactor with dual site catalysts. Use of a dual site catalyst for the production of a bimodal resin in a single reactor is also known.

Chromium catalysts for use in polyolefin production tend to broaden the molecular weight distribution and can in some cases produce bimodal molecular weight distribution but usually the low molecular part of these resins contains a substantial amount of the co-monomer. Whilst a broadened molecular weight distribution provides acceptable processing properties, a bimodal molecular weight distribution can provide excellent properties.

Ziegler-Natta catalysts are known to be capable of producing bimodal polyethylene using two reactors in series. Typically, in a first reactor, a low molecular weight homopolymer is formed by reaction between hydrogen and ethylene in the presence of the Ziegler-Natta catalyst. It is essential that excess hydrogen be used in this process and, as a result, it is necessary to remove all the hydrogen from the first reactor before the products are passed to the second reactor. In the second reactor, a copolymer of ethylene and hexene is made so as to produce a high molecular weight polyethylene.

Metallocene catalysts are also known in the production of polyolefins. For example, EP-A-0619325 describes a process for preparing polyolefins such as polyethylenes having a multimodal or at least bimodal molecular weight distribution. In this process, a catalyst system which includes at least two metallocenes is employed. The metallocenes used are, for example, a bis(cyclopentadienyl) zirconium dichloride and an ethylene-bis(indenyl) zirconium dichloride. By using the two different metallocene catalysts in the same reactor, a molecular weight distribution is obtained, which is at least bimodal.

Polyethylene resins are known for the production of pipes. Pipe resins require high resistance against slow crack growth as well as resistance to rapid crack propagation yielding impact toughness. However, there is a need to improve in the performance of currently available pipe resins.

Methods are known for producing an improved pipe resin by employing specific catalysts belonging to the general types discussed above, to produce a high molecular weight linear low density polyethylene fraction having a narrow MWD.

However, it is still necessary to produce a polyethylene that can be used in a pipe to increase the stress-crack resistance of the pipe sufficiently to render it suitable for use in no-sand pipe installation. Pipes for no-sand pipe installation require especially high stress-crack resistance, since their surfaces are not shielded from abrasive rock and earth surfaces by a layer of sand, but instead are directly in contact with the rock and/or earth.

It is known to use conventional cross-linked polyethylene for no-sand installable pipes. However, cross-linked polyethylene is very expensive (considerably more expensive than non-crosslinked PE). In addition, large diameter pipes formed from cross-linked PE are not available and it is not possible to join such pipes by butt-fusion. These characteristics of cross-linked polyethylene are discussed in "The creep behaviour of polyethylene under the influence of local stress concentrations", 3R *international* 34, volume 10–11, 1995, pages 573–579. In this document, cross-linked polyethylene (PE-X) having a full notch creep test value of 5100 hrs is disclosed (FIG. 12). Problems in welding PE-X are discussed in "Long term durability of welds involving cross-linked and non cross-linked polyethylene" 3R *international* 37, volume 10–11, 1995, pages 694–699.

It is also known to provide a protective layer around conventional non-crosslinked PE to render it suitable for use in no-sand installation pipes. This also increases the cost considerably and has the disadvantage that the outer layer needs to be peeled off for welding, making installation laborious and expensive. The characteristics and problems associated with these materials are discussed in detail in the published newsletter of Werner Strumann GmbH & Co., October 1997, pages 1–3.

U.S. Pat. No. 5,405,901 discloses the production of polyethylene blends in gas phase using two reactors for the production of films. A low density resin is produced in the first reactor and a high density resin is produced in the second reactor. There is no disclosure of the production of a polyethylene blend having properties required by pipes, in particular pipes having stress crack resistance.

U.S. Pat. No. 5,284,613 discloses the production of bimodal molecular weight polyethylene resins containing two fractions of different molecular weight for the production of blown films exhibiting improved machine direction/transverse direction tear balance. Again, there is no disclosure of the production of polyethylene pipe resins, in particular having improved stress-crack resistance.

EP-A-0533154 discloses the production of ethylene polymer blends of a virgin or recycled low molecular weight ethylene polymer produced from a chromium-based catalyst and a high molecular weight ethylene polymer produced from a titanium-based catalyst. It is disclosed that the blends may be used for bottle, film, pipe and/or drum applications. However, the resins disclosed therein do not exhibit superior stress-crack resistance required by the art.

U.S. Pat. No. 4,547,551 discloses the production of ethylene polymer blends of high molecular weight and low molecular weight ethylene polymer, with the resins being useful for the manufacture of film or in blow moulding techniques, the production of pipes, and wire coating. There is no disclosure of the provision of pipe resins having enhanced stress crack resistance.

SUMMARY OF THE INVENTION

It is an object of the present invention to overcome the problems of the above prior art and to provide a polyethylene suitable for use in a pipe that can be laid in a no-sand installation method. Accordingly, the present invention provides a high density multimodal polyethylene, having a shear ratio (SR) of 18 or more and comprising at least 20% by weight of a high molecular weight fraction, which high molecular weight fraction has:

(a) a density ($\rho$) of 0.930 g/cm$^3$ or less; and (b) a high load melt index (HLMI) of 0.30 g/10 mins or less.

The present invention further provides a method for the production of a high density multimodal polyethylene as defined above, which method comprises mixing a high molecular weight polyethylene fraction as defined above with one or more lower molecular weight fractions.

Further provided is a polyethylene pipe comprising a high density multimodal polyethylene as defined above. The invention also provides a polyethylene pipe comprising a high density multimodal polyethylene having a high molecular weight fraction, which high molecular weight fraction has a density ($\rho$) and a high load melt index (HLMI), which satisfy the following relationship:

$$\rho \times HLMI \leq 0.37$$

wherein the units of density are g/cm$^3$ and the units of HLMI are g/10 mins, and the density is 0.930 g/cm$^3$ or less.

Further provided is a method of pipe installation comprising forming a hole or trench for receiving a pipe and installing a polyethylene pipe as defined above in the hole or trench. The invention also provides a method of re-lining a pipe comprising installing a polyethylene pipe as defined above in an existing pipe.

Additionally, the present invention provides use of a high density multimodal polyethylene comprising a high molecular weight fraction, which high molecular weight fraction has a density ($\rho$) and a high load melt index (HLMI), which satisfy the following relationship:

$$\rho \times HLMI \leq 0.37$$

wherein the units of density are g/cm$^3$ and the units of HLMI are g/10 mins, wherein the high density multimodal polyethylene comprises at least 20% by weight of the high molecular weight fraction and the density ($\rho$) is 0.930 g/cm$^3$ or less and the high load melt index (HLMI) is 0.40 g/10 mins or less, in a polyethylene article to provide the article with resistance to stress-cracking.

By virtue of the careful control of the density, the HLMI and the SR value of the high molecular weight fraction of multimodal polyethylene, polyethylene can be produced which has stress crack resistance superior to known polyethylene. The superior mechanical properties of the present polyethylene enable it to be used in pipes for no-sand installation.

In conventional pipe installation, a sand bed is employed on which the polyethylene pipe sits, which sand bed protects the surface of the polyethylene pipe from the destructive mechanical forces applied to it by, for example, sharp rocks and stones in the surrounding earth. The use of sand requires an extra installation step and, when transportation and purchase costs for the sand are considered, the total cost of using sand amounts to approximately 10% of the total installation cost. Therefore, a further advantage of the present polyethylene and pipes is that they can afford a 10% reduction in pipe installation costs, whilst still providing superior mechanical properties.

The multimodal polyethylene of the present invention can be bimodal, trimodal or may have a larger number of fractions. The high molecular weight fraction can itself be multimodal, e.g. bimodal or trimodal. Thus, the high molecular weight fraction may include all of the fractions of the polyethylene except the lowest molecular weight fraction, or may include only the highest molecular weight fraction. Preferably the high molecular weight fraction is monomodal.

The high molecular weight fraction should have a density of 0.930 g/cm$^3$ or less, an HLMI of 0.4 g/10 mins or less more preferably 0.3 g/10 mins or less and have an SR value of 18 or more. The HLMI is the high load melt index and is measured according to the procedures of ASTM D 1238 using a load of 21.6 kg at a temperature of 190° C. Other related parameters include the MI-5 and MI-2, which are equivalent to the HLMI, except loads of 5 kg and 2.16 kg are used respectively. The SR value is a ratio of the HLMI and the MI-5 (SR-5). The HLMI of the high molecular weight fraction (HMWF) is preferably 0.30 g/10 mins or less and most preferably 0.25 g/10 mins or less. The density of the HMWF is preferably 0.928 g/cm$^3$ or less, more preferably 0.925 g/cm$^3$ or less and most preferably 0.923 g/cm$^3$ or less. The SR value of the final polyethylene is 18 or more. Preferably the SR value of the polyethylene is 20 or more and most preferably from 25 to 35.

The proportion by weight of the HMWF is 20% or more relative to the total weight of polyethylene. Preferably the proportion of the HMWF is 45% or more, and may be 55% or more or 60% or more if required. The most preferred content is 45%–55%.

Typically the final polyethylene comprising both the HMWF and lower molecular weight fractions has a density of 0.955 g/cm$^3$ or less, preferably 0.945 g/cm$^3$ or less. Preferably the final polyethylene density is from 0.930–0.955 g/cm$^3$.

The HLMI of the final polyethylene comprising both the HMWF and lower molecular weight fractions is 30 g/10 mins or less, typically 15 g/10 mins or less, and preferably from 5–10 g/10 mins.

The stress crack resistance of the polyethylene of the present invention can be graded with reference to the full notch creep test (FNCT) and/or the notch pipe test (NPT). It is preferred that the polyethylene of the present invention has a value of 2000 hrs or more, preferably 4000 hrs or more and most preferably 5000 hrs or more in a FNCT. In a further preferred embodiment the present polyethylene has a value of 5000 hrs or more, preferably 7000 hrs or more and most preferably 10000 hrs or more in a NPT. Generally, the lower the density and the HLMI of the high molecular weight fraction of the present polyethylenes, the more resilient these polyethylenes are in the FNCT and the NPT. In addition, the greater the proportion of the HMWF, the higher the FNCT and NPT times of the polyethylene will be.

The full notch creep test (FNCT) is used mainly in Europe by resin producers for development purposes. Depending on the selected test conditions, the rupture time can be strongly reduced, such that information can be obtained on highly resistant materials in a short time. The test equipment is simple, being the usual set-up for a tensile creep test. In the test, a sample is immersed in water or a specified surfactant solution at 80° C. or 95° C. A constant load is applied to the sample (a small bar—10×10×100 mm) and the sample is notched on four sides perpendicularly to the stress direction. The time to rupture is recorded as a function of the applied stress. The test method has been standardised in Japan (JIS K 6774). With reference to the present invention, the conditions applied were:

a 10×10×100 mm bar sample notched on four sides with a razor blade to a depth of 1.6 mm was immersed in a solution of 2% by weight Arkopal® N-100 (Hoechst commercial product) at 95° C. (±0.5° C.) and a constant stress load of 4.0 MPa applied based on the initial remaining cross section at the place where the notches were introduced.

The notch pipe test (NPT) was developed by British Gas and has been standardised as EN 33479. It is applicable to pipes with a wall thickness of 5 mm or more or a diameter of 63 mm or more. The pipe is mechanically notched and pressure tested at 80° C. A hoop stress of 4.0 MPa is applied for PE 80 and of 4.6 MPa for PE 100 (based on the unnotched pipe). Four notches are machined at 90° on the circumference of the pipe. The depth must be 20±2% of the minimum wall thickness. The test conditions followed for the production of the present results were strictly according to the EN 33479. The pressure test method was carried out in accordance with ISO 1167.

The polyethylene of the present invention can be PE 100 or PE 80 and can be chemically or physically blended. A PE 100 is defined as a polyethylene which, when formed into a pipe and subjected to an internal pipe resistance test (measured according to ISO 1167) at 20° C., has a stress of 10 MPa or greater when the internal pipe resistance test curve is extrapolated to 50 yrs. A PE 80 is defined in the same way, except it has a stress of between 8 and 10 MPa when the internal pipe resistance test curve is extrapolated to 50 yrs. The nature of the blending of the HMWF with the lower molecular weight fractions (LMWF) is not specifically limited by the choice of PE 100 or PE 80.

The polyethylene of the present invention is produced by a method which comprises mixing the high molecular weight polyethylene fraction with one or more lower molecular weight fractions. In one embodiment, the high molecular weight fraction is produced separately from the one or more lower molecular weight fractions, and said high and lower molecular weight fractions are then mixed together in a physical blending process. Alternatively, the high molecular weight fraction is produced in the presence of the one or more lower molecular weight fractions, or the one or more lower molecular weight fractions are produced in the presence of the high molecular weight fraction, such that said high and lower molecular weight fractions are mixed together in a chemical blending process.

In the case of chemical blending to form a bimodal polyethylene, the high (first) and low (second) molecular weight polyethylene fractions can be made in two serially connected reactors, or three serially connected reactors for making a polyethylene resin having a trimodal molecular weight distribution, in which a third polyethylene is chemically blended with the first and second polyethylenes. In an alternative arrangement, the first and second polyethylenes may be chemically blended as foresaid, and then physically blended with a third polyethylene to produce a trimodal molecular weight distribution. In further alternative arrangements, the polyethylene resin has a bimodal molecular weight distribution and is produced by physically blending the first and second polyethylenes together or alternatively the polyethylene resin has a trimodal molecular weight distribution and is produced by physically blending together the first, second and third polyethylenes. Alternatively, a trimodal PE may be produced in three reactors in series.

Exemplary processes and conditions for producing the multimodal polyethylene of the present invention will now be discussed. The methods for producing the present polyethylene are not particularly limited, provided that the density and HLMI of the HMWF are controlled within the limits discussed above, and the SR value of the final polyethylene is 18 or above. These values can be controlled by making appropriate alterations to the production conditions according to known standard procedures. However, in a preferred embodiment, the polyethylene of the present invention is formed by polymerising ethylene monomer in the presence of a catalyst. When producing the HMWF of the polyethylene, an alpha olefin co-monomer having from 3–10 carbon atoms, such as butene or hexene, is preferably also present. The HMWF and the LMWF can be produced in parallel reactors and then blended together (physical blending) or can be produced together in the same reactor, or in two or more reactors in series (chemical blending). The catalyst employed is preferably a metallocene, but chromium based catalysts and Ziegler-Natta catalysts can also be used.

A particularly preferred method for producing the present polyethylene comprises:

(i) contacting ethylene monomer and a co-monomer comprising an alpha-olefin having from 3 to 10 carbon atoms with a first catalyst system in a first reactor under first polymerisation conditions to produce a product comprising a first polyethylene having a first molecular weight and a first density and the first catalyst system comprising (a) a metallocene catalyst selected from one of components A or B, component A comprising a bis tetrahydroindenyl compound of the general formula $(IndH_4)_2R"MQ_2$ in which each Ind is the same or different and is indenyl or substituted indenyl, R" is a bridge which comprises a $C_1$–$C_{20}$ alkylene radical, a dialkyl germanium or silicon or siloxane, or an alkyl phosphine or amine radical, which bridge is substituted or unsubstituted, M is a Group IVB transition metal or vanadium and each Q is hydrocarbyl having 1 to 20 carbon atoms or halogen and component B comprising a metallocene catalyst of general formula $R"(CpR_m)(Cp'R'_n)MQ_2$, wherein Cp is a cyclopentadienyl moiety, Cp' is a substituted or unsubstituted fluorenyl ring; each R is independently hydrogen or hydrocarbyl having 1 to 20 carbon atoms in which 0 m 4; each R' is independently hydrocarbyl having 1 to 20 carbon atoms in which 0 n 8; R', M and Q are each as defined above, the metallocene component B having a centroid-M-centroid angle in the range 105° to 125°; and (b) a co-catalyst which activates the catalyst component;

(ii) providing a second polyethylene having a second lower molecular weight and higher density than the first polyethylene; and (iii) mixing together the first and second polyethylenes to form a polyethylene resin having a multimodal molecular weight distribution.

In the above method, the first polyethylene may be monomodal or bimodal, the second polyethylene may have a monomodal molecular weight distribution and may have been produced using a metallocene catalyst, a Ziegler-Natta catalyst or a chromium-oxide based catalyst. Alternatively, the second polyethylene may have a bimodal molecular weight distribution and has been produced using one or two of those different catalyst systems. The first and second polyethylenes may be mixed together with a third polyethylene to provide a trimodal molecular weight distribution in the resultant polyethylene resin. The third polyethylene may be produced using a metallocene catalyst, a Ziegler-Natta catalyst or a chromium-oxide based catalyst.

METALLOCENE COMPONENTS A AND B

When the metallocene catalyst is catalyst A, each bis tetrahydroindenyl compound may be substituted in the same way or differently from one another at one or more positions in the cyclopentadienyl ring, the cyclohexenyl ring and the ethylene bridge. Each substituent group may be independently chosen from those of formula $XR_v$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect co-ordination of the olefin monomer to the metal M. Substituents on the cyclopentadienyl ring preferably have R as hydrogen or $CH_3$. More preferably, at least one and most preferably both cyclopentadienyl rings are unsubstituted.

In a particularly preferred embodiment, both indenyls are unsubstituted.

R' is preferably a methylene or ethylene bridge which is substituted or unsubstituted.

The metal M is preferably zirconium, hafnium or titanium, most preferably zirconium. Each Q is the same or different and may be a hydrocarbyl or hydrocarboxy radical having 1–20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl) zirconium dichloride is a particularly preferred bis tetrahydroindenyl compound used in the present invention.

The metallocene catalyst component A used in the present invention can be prepared by any known method. A preferred preparation method is described in J. Org. Chem. 288, 63–67 (1985).

When the metallocene catalyst is catalyst B, decreasing the centroid-M-centroid angle in Zr-based metallocenes of catalyst B tends to increase both the long chain branching and the co-monomer incorporation of the metallocene catalyst when used for the production of polyolefins. The metallocene catalysts B of the present invention have a very open structure which permits the facile incorporation of co-monomer with larger substituents such as hexene in polyolefin production. In this way, PE with densities around 0.9 or lower may be produced at a commercially acceptable polymerisation temperature in a slurry process. The production of PE with such low densities has hitherto not been possible with Cr-based and closed structure Cent-Zr-Cent (>125°) metallocenes in a loop slurry process. Lower co-monomer concentrations need be used in the process thereby reducing the likelihood of reactor fouling and avoiding excessive use of expensive co-monomer.

Preferably Cp is a substituent cyclopentadienyl in which each R is independently $XR^*_3$ in which X is C or Si and each R* is independently H or hydrocarbyl having 1 to 20 carbon atoms. More preferably the cyclopentadienyl is substituted with $Ph_2CH$, $Me_3C$, $Me_3Si$, Me, Me and $Me_3C$, Me and $SiMe_3$, Me and Ph, or Me and $CH_3$—CH—$CH_3$.

Preferably, each R" is independently $YR'''_3$ in which Y is C or Si and each R''' is independently H or hydrocarbyl having 1 to 20 carbon atoms.

The structural bridge $\underline{R}$" [RO] is generally an alkylene radical having 1 to 20 carbon atoms, a dialkyl germanium or silicon or siloxane, alkyl phosphine or amine, preferably Me—C—Me, Ph—C—Ph,—$CH_2$—, Et—C—Et, Me—Si—Me, Ph—Si—Ph or Et—Si—Et.

The metal M is preferably Zr or Hf and each Q is preferably Cl.

In order to maximise co-monomer incorporation, it is preferred that the centroid-M-centroid angle is no more than 119°.

The co-catalyst which activates the metallocene catalyst component can be any co-catalyst known for this purpose such as an aluminium-containing co-catalyst or a boron-containing co-catalyst. The aluminium-containing co-catalyst may comprise an alumoxane, an alkyl aluminium and/or a Lewis acid.

The alumoxanes used in the process of the present invention are well known and preferably comprise oligomeric linear and/or cyclic alkyl alumoxanes represented by the formula:

(I)

for oligomeric, linear alumoxanes and

(II)

for oligomeric, cyclic alumoxane,
wherein n is 1–40, preferably 10–20, m is 3–40, preferably 3–20 and R is a $C_1$–$C_8$ alkyl group and preferably methyl.

Generally, in the preparation of alumoxanes from, for example, aluminium trimethyl and water, a mixture of linear and cyclic compounds is obtained.

Suitable boron-containing co-catalysts may comprise a triphenylcarbenium boronate such as tetrakis-pentafluorophenyl-borato-triphenylcarbenium as described in EP-A-0427696, or those of the general formula [L'—H]+[B $Ar_1$ $Ar_2$ $X_3$ $X_4$]—as described in EP-A-0277004 (page 6, line 30 to page 7, line 7).

The metallocene catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene. Preferably, the support is a silica having a surface area comprised between 200 and 900 $m^2/g$ and a pore volume comprised between 0.5 and 4 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

Where the reaction is performed in a slurry using, for example, isobutane, a reaction temperature in the range 70° C. to 110° C. may be used. Where the reaction is performed in solution, by selection of a suitable solvent a reaction temperature in the range 150° C. to 300° C. may be used. The reaction may also be performed in the gas phase using a suitably supported catalyst.

In accordance with the invention, ethylene and the alpha-olefinic co-monomer are supplied to the reactor containing the metallocene catalyst. Typical co-monomers include hexene, butene, octene or methylpentene, preferably hexene. Hydrogen may be additionally supplied to the first reaction zone. Because the metallocene catalyst component used in the present invention exhibits good co-monomer response as well as good hydrogen response, substantially all of the co-monomer is consumed in the first reactor in this embodiment. This produces high molecular weight polyethylene copolymer having a monomodal molecular weight distribution.

The temperature of the reactor may be in the range of from 70° C. to 110° C., preferably from 70° C. to 100° C.

DETAILED DESCRIPTION OF THE PREFERRED EMBODIMENTS

Embodiments of the present invention will now be described in the following by way of example only.

EXAMPLE 1

A bimodal resin was produced by chemical blending in two reactors in series, using a Ziegler-Natta catalyst. The characteristics of the high molecular weight (HMW) fraction were determined on samples taken from the first reactor. The results are shown in Table 1 below. The final bimodal resin was formulated using 50% wt. of the HMW fraction and 50% wt. of a low molecular weight (LMW) fraction having high density.

The bimodal resin was extruded on a laboratory double screw extruder in two extrusion steps. A blue pigment was introduced in this process to form blue polymer granules. Two extrusion steps were employed under mild conditions at a set temperature of 200° C. Standard additives in the form of a master batch were added during the first extrusion step to protect the compound.

The pipes for the notch pipe test were produced under standard conditions on a single screw pipe extrusion machine.

TABLE 1

|  | HMW fraction | Bimodal blue compound |
| --- | --- | --- |
| Co-monomer | hexene | — |
| Proportion | 50% | — |
| HLMI | 0.19 g/10 mins | 7.0 g/10 mins |
| MI-5 | — | 0.23 g/10 mins |
| SR-5 | — | 30.4 |
| Density | 0.927 g/cm³ | 0.949 g/cm³ |
| FNCT | — | 4816 h |
| NPT | — | >5000 h* |

*Test stopped voluntarily

EXAMPLE 2

A bimodal resin was produced by physically blending two monomodal resins produced in two slurry loop reactors, using a Ziegler-Natta catalyst. The characteristics of each monomodal resin as well as those of the final blue bimodal product are shown in Table 2 below.

The bimodal resin was produced by physically mixing the two monomodal resins using 50% wt. of the HMW fraction and 50% wt. of a LMW fraction. The HMW fraction was highly co-polymerised and the LMW fraction was of high density. The mixture was extruded into blue granules using the same conditions and pigment as described in Example 1. Additives were introduced as described in Example 1.

The pipes for the NPT were produced as described in Example 1.

TABLE 2

|  | HMW fraction | LMW fraction | Bimodal blue compound |
| --- | --- | --- | --- |
| Co-monomer | hexene | — | — |
| Proportion | 50% wt. | 50% wt. | — |
| HLMI | 0.25 g/10 mins | — | 8.8 g/10 mins |
| MI-5 | — | — | 0.31 g/10 mins |
| SR-5 | — | — | 28.7 |
| MI-2 | — | 65 | — |
| Density | 0.922 g/cm³ | >0.970 g/cm³ | 0.949 g/cm³ |
| FNCT | — | — | 5309 h |
| NPT | — | — | >10000 h* |

*Test stopped voluntarily

EXAMPLE 3

A bimodal resin was produced by physically blending two monomodal resins produced in two slurry loop reactors using a metallocene catalyst. The characteristics of each monomodal resin as well as those of the final black bimodal product are shown in Table 3 below.

The bimodal resin was produced by physically mixing the two monomodal resins in a proportion of 60% wt. of the HMW fraction and 40% wt. of a LMW fraction. The HMW fraction was highly co-polymerised and the LMW fraction was of high density. The mixture was extruded with carbon black pigment into black granules using a laboratory double screw extruder. Mild conditions were used and two extrusion steps were employed. Standard additives in the form of a master batch were introduced during the first extrusion step. The final compound contained from 2.0–2.5% wt. of carbon black.

The pipes for the notch pipe test were produced as described in Example 1.

TABLE 3

|  | HMW fraction | LMW fraction | Bimodal black compound |
|---|---|---|---|
| Co-monomer | hexene | — | — |
| Proportion | 60% wt. | 40% wt. | — |
| HLMI | 0.40 g/10 mins | >20000 g/10 mins | 6.9 g/10 mins |
| MI-5 | — | — | 0.27 g/10 mins |
| SR-5 | — | — | 25.6 |
| Density | 0.925 g/cm$^3$ | >0.97 g/cm$^3$ | 0.954 g/cm$^3$ |
| NPT | — | — | >8000 h* |

*Test stopped voluntarily

As can be clearly seen from Examples 1–3 above, the resins produced according to the present invention display superior stress-crack resistance, as reflected in the FNCT test results (>4800 h in Examples 1 and 2). In particular, pipes formed from these resins display excellent properties, having very high NPT times. The tests were halted voluntarily in each of the Examples, since the pipes were able to withstand the test for very long periods of time (>5000 h, >8000 h and >10000 h in Examples 1–3 respectively).

What is claimed is:

1. A polyethylene pipe comprising a high density multimodal polyethylene having a shear ratio (SR) of 18 or more and a final high load melt index (HLMI) of 15 g/10 min or less and having a high molecular weight fraction, which high molecular weight fraction has a density ($\rho$) and a high load melt index (HLMI), which satisfy the following relationship:

$$\rho \times HLMI \leq 0.37$$

wherein the units of density are g/cm$^3$ and the units of HLMI are g/10 mins, and the density is 0.930 g/cm$^3$ or less.

2. A pipe according to claim 1, in which the high density multimodal polyethylene has at least 20% by weight of the high molecular weight fraction, and the high molecular weight fraction has a high load melt index (HLMI) of 0.40 g/10 mins or less.

3. A pipe according to claim 2, in which the high density multimodal polyethylene has a shear ratio (SR) of 18 or more and comprising at least 20% by weight of a high molecular weight fraction, which high molecular weight fraction has:

(a) a density ($\rho$) of 0.93 g/cm$^3$ or less; and
(b) a high load melt index (HLMI) of 0.30 g/10 mins or less.

4. A method of pipe installation comprising forming a hole or trench for receiving a pipe and installing a polyethylene pipe formed from a high density multimodal polyethylene having a shear ratio (SR) of 18 or more and a final high load melt index (HLMI) of 15 g/10 min or less and having a high molecular weight fraction, which high molecular weight fraction has a density ($\rho$) and a high load melt index (HLMI), which satisfy the following relationship:

$$\rho \times HLMI \leq 0.37$$

wherein the units of density are g/cm$^3$ aid the units of HLMI are g/10 min, and the density is 0.93 g/cm$_3$ or less in the hole or trench.

5. A method according to claim 4, which method is a no-sand installation method, the pipe being installed in the hole or trench directly in contact with the earth.

6. A method for re-lining a pipe comprising installing a polyethylene pipe formed from a high density multimodal polyethylene having a shear ratio of 18 or more and a final high load melt index (HLMI) of 15 g/10 min or less and having a high molecular weight fraction, which high molecular weight fraction has a density ($\rho$) and a high load melt index (HLMI), which satisfy the following relationship:

$$\rho \times HLMI \leq 0.37$$

wherein the units of density are g/cm$^3$ and the units of HLMI are g/10 min, and the density is 0.93 g/cm3 or less in an existing pipe.

7. An article having resistance to stress-cracking, the article being formed of a high density multimodal polyethylene having a shear ratio (SR) of 18 or more and a final high load melt index (HLMI) of 15 g/10 min or less and comprising a high molecular weight fraction, which high molecular weight fraction has a density ($\rho$) and a high load melt index (HLMI), which satisfy the following relationship:

$$\rho \times HLMI \leq 0.37$$

wherein the units of density are g/cm$^3$ and the units of HLMI are g/10 mins, wherein the high density multimodal polyethylene comprises at least 20% by weight of the high molecular weight fraction and the density ($\rho$) is 0.930 g/cm$^3$ or less and the high load melt index (HLMI) is 0.40 g/10 mins or less.

8. An article according to claim 7, wherein the article is a polyethylene pipe.

* * * * *